Figure 1:
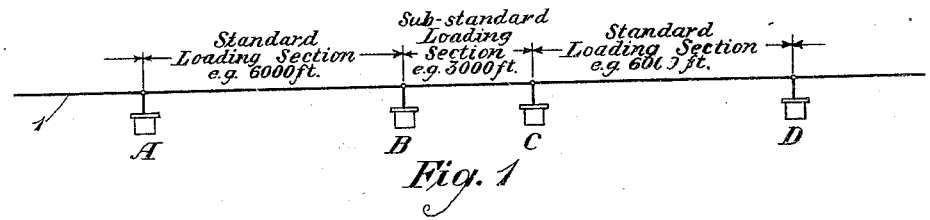

Nov. 24, 1931.  R. A. HAISLIP  1,832,981
SYSTEM FOR BUILDING-OUT LOADING SECTIONS OF SIGNALING CABLES

Filed Feb. 2, 1931

INVENTOR
R. A. Haislip
BY
ATTORNEY

Patented Nov. 24, 1931

1,832,981

UNITED STATES PATENT OFFICE

RICHARD A. HAISLIP, OF CALDWELL, NEW JERSEY, ASSIGNOR TO AMERICAN TELEPHONE AND TELEGRAPH COMPANY, A CORPORATION OF NEW YORK

SYSTEM FOR BUILDING OUT LOADING SECTIONS OF SIGNALING CABLES

Application filed February 2, 1931. Serial No. 513,038.

This invention relates to a system for building out electrically the loading sections of signaling cables, and particularly to a method and type of cable by which such building-out may be more economically and satisfactorily performed than by arrangements heretofore employed.

In the loading of signaling cables the loading coils are spliced to the cable conductors at predetermined points, and in an ideal situation the coils would be spaced apart by equal distances, assuming that cable having the same capacitance and resistance per unit length were used throughout the entire distance. In the construction of a loaded cable, by which is meant a cable comprising a plurality of loading sections, it is frequently impracticable to splice the loading coils to the cable conductors at points that will render the adjacent loading sections substantially equal in length. For example, in the planing of a loaded cable it may be necessary to employ sections of submarine cables or to extend cables through long tunnels. From the standpoint of cost and maintenance it is undesirable to splice loading coils into a submarine cable or one extending through a long tunnel. If, in the laying out of the loading of such cable the theoretically correct location for a loading coil occurs in the section of submarine cable or in the tunnel section of the cable it is practically necessary to place the loading at one of the ends of the submarine cable or of the tunnel. This causes a shortening of one of the loading sections which produces an impedance irregularity that impairs transmission. To avoid that difficulty it is necessary to build out electrically those loading sections that are below the normal desired length, so that all loading sections of the cable shall have substantially the same electrical length.

Various arrangements have been used heretofore to accomplish that result. In one arrangement a length of cable was spliced to the main cable as a stub, the conductors in the stub cable being looped in series with those in the main cable, thereby increasing the capacitance and resistance of the loading section. That arrangement was undesirable because of its high installation cost and also because an extra duct in the cable subway was required for the stub cable. In a later arrangement all or a part of the cable employed in the short loading section consisted of a special building-out cable having conductors whose resistance was twice that of the conductors in the standard cable used in loading section of normal length and having a capacitance twice as great per unit length as that of the standard cable. A given length of such building-out cable was equivalent from the standpoint of resistance and capacitance to twice the length of the standard cable. To obtain the high capacitance it was necessary to impregnate the core of the cables. The use of an impregnating compound tended to make the cable stiff at low temperatures, which increased the difficulty in handling the cable.

The present invention resides in a system for building-out loading sections in which the building-out cable has conductors of greater resistance per unit length than those in the normal standard cable but having the same capacitance per unit length as the said standard cable.

Figure 2:
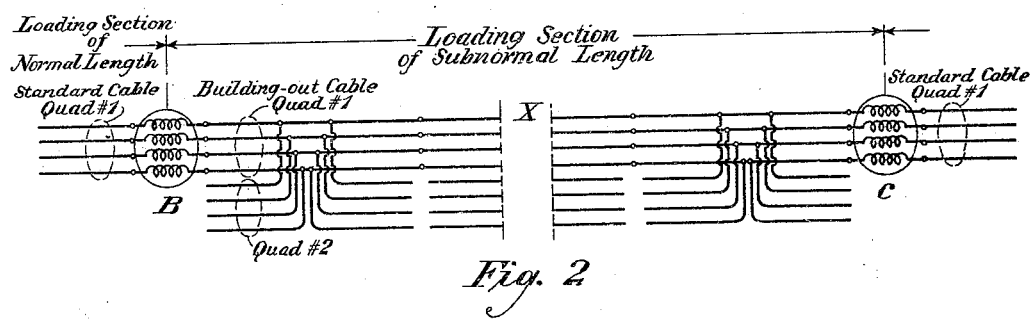
Figure 3:
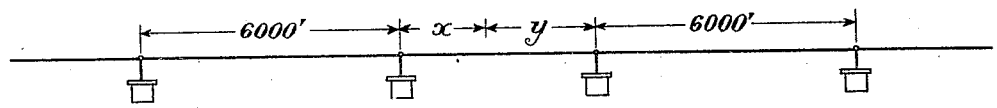

The manner in which a loading section may be built out electrically to any desired value will be apparent from the following description when read in connection with the attached drawings, of which Figure 1 shows schematically a loaded cable in which one of the loading sections is one-half the normal standard length; Fig. 2 shows the manner in which the short loading section of Fig. 1 may be rendered the electrical equivalent of the normal standard loading section by using in the short section only the special cable hereinafter described; and Fig. 3 illustrates the application of the invention to a situation where the special building-out cable forms only part of the entire cable of the short loading section.

In Fig. 1, 1 represents a cable that is to be loaded at the points A, B, C, and D. It will be assumed that, in laying out of the loading it has been found impracticable to make all loading sections of a predetermined length, e. g. 6,000 feet. The section B—C cannot be made geographically longer than 3,000 feet, which is one-half of the length of a normal loading section such as A—B or C—D. To avoid an impedance irregularity it is necessary to build-out the section B—C so that it will be the electrical equivalent of a normal loading section. The manner in which that is done is as follows:—

In the shortened section there would be employed a type of cable that has substantially twice as many pairs or quads of conductors as the standard cable used in a normal section. For example, assuming that the standard cable employed in section A—B contained 19 quads 16-gauge, six pairs 16-gauge, and 114 quads 19-gauge conductors, the building-out cable employed in the subnormal section would contain 40 quads 19-gauge, 12 pairs 19-gauge, and 234 quads 22-gauge conductors. It will be seen that there are substantially twice as many quads of 19-gauge conductors in the building-out cable as there are quads of 16-gauge conductors in the standard cable; and likewise, there are twice as many pairs of 19-gauge and quads of 22-gauge conductors in the building-out cable as there are pairs of 16-gauge and quads of 19-gauge in the standard cable. Those quads and pairs of 19-gauge conductors in the building-out cable are intended to be used in connection with quads and pairs respectively of 16-gauge conductors in the standard cable; and likewise, the quads of 22-gauge conductors in the building-out cable are to be used with the quads of 19-gauge conductors in the standard cable.

Fig. 2 shows the method by which one of the quads of conductors in the subnormal section B—C may be rendered the electrical equivalent of a quad of standard cable in a loading section of normal length. At B and C in Fig. 2 are represented the windings of a loading coil for a quad of conductors. Let it be assumed that the quad connected to the left hand terminals of the coil-windings at B and to the right hand terminals of the windings at C are made up of 16-gauge conductors. There would accordingly be connected to the other terminals of the coil windings at B and C a quad of 19-gauge conductors in the building-out cable. Since the resistance of the 19-gauge conductors is twice that of the 16-gauge conductors, the resistance of each 19-gauge conductor of the subnormal loading section, which has been assumed to be 3,000 feet long, would be the same as the resistance of each 16-gauge conductor in a standard loading section, 6,000 feet long. Having thus rendered the resistance of the conductors in the short section equivalent to the resistance of corresponding conductors in the normal sections, it becomes necessary to render the capacitance of the pairs and phantoms in the short sections equivalent to those in the normal sections. In order to make the capacitance of the pairs and of the phantom circuits of the short loading section equal to that of a standard loading section, it is necessary to bridge capacitance across the pairs of each quad. The necessary capacitance is provided by the quad in the building-out cable that is adjacent to the quad of the same gauge that has been connected in series with the quads in the standard loading sections adjoining. Thus, in Fig. 2, quad 1 of the building-out cable has been connected with the terminals of the loading coils so as to be in series with the conductors of the 16-gauge quads in the adjacent loading sections, whereas quad No. 2 of the building-out cable has been bridged across the pairs of conductors of quad No. 1 at the splicing point between sections 1 and 2 of the building-out cable to increase the capacitance of the pairs and of the phantom circuit of quad No. 1. In like manner quad No. 2 of cable sections 3 and 4 would be bridged across pairs of quad No. 1 of those same sections at splicing points between these sections of the building-out cable. Similarly other sections of cable would be spliced. Since it has been assumed that the building-out cable has conductor resistance twice as large as that of the standard cable and has the same capacity per unit length as the standard cable, the employment of building-out cable throughout the entire length of a 3,000 foot loading section would make that section the electrical equivalent of a standard 6,000 foot loading section.

Where a loading section has a length greater than 3,000 and less than 6,000 feet, it would be necessary to employ standard cable throughout part of the distance and building-out cable for the remainder. Such condition is illustrated in Fig. 3. The amount of building-out cable employed would be such that, when connected to the standard cable in the short loading section, the resistance of each conductor of the short loading section will be equal to that of a conductor of corresponding gauge of the standard loading section and the capacitance of the pairs and phantoms of the short section will be correspondingly the same as those of the standard section.

The advantage of the system just described resides in part in the fact that it does not require additional duct space in the cable subway, inasmuch as the bridged conductors that provide the increased capacitance are contained within the same cable sheath as the conductors connected in series with the conductors of the adjacent loading sections; and, furthermore, the difficulty inherent in the impregnated type of cable has been eliminated by the use of a non-impregnated type of cable having the same capacitance between pairs and quads as exists in the standard cable employed in standard loading sections.

What is claimed is:

1. The method of equalizing the electrical characteristics of the circuits of a plurality of loading sections of a signaling cable, which consists in employing in those loading sections that are geographically shorter than a normal predetermined length, sections of cable having greater resistance per unit length than that of the standard cable employed in loading sections of the predetermined length, splicing together the sections of the said cable of greater unit resistance to form continuous pairs of signaling conductors throughout the short loading section, and bridging across the said pairs of signaling conductors other pairs of conductors in the same cable sections so that the capacitance of the said pairs of signaling conductors of the short loading section will substantially equal the capacitance of a pair of conductors of standard cable of a loading section of normal length.

2. The method of substantially equalizing electrically the loading sections of a signaling cable, which consists in building-out those loading sections shorter than a predetermined length, employing therein, in substitution for standard cable, a quantity of building-out cable whose conductor resistance is greater than that of the standard cable employed in full length loading sections but having the same capacitance per unit length as the said standard cable, the quantity of building-out cable being such that the conductor resistance of the built-out section shall be the same as that of a full length loading section of standard cable, then bridging across each pair of the building-out cable another pair of conductors of the same cable, the amount of bridged capacitance being sufficient to render the total capacitance of each pair of the shorter loading section equal to that of a pair of the standard cable in a full length loading section.

3. In a loaded signaling system in which the loading coils are normally equidistantly spaced a predetermined distance apart but in which there may occur a section that is shorter than the normal predetermined distance, the method of rendering the short section substantially equal electrically to the loading sections of normal length, which consists in employing in the said short loading section, sections of building-out cable having conductors whose resistance is greater than that of the conductors in the standard cable, the number of sections being such that, when spliced together, the total resistance of each pair for the entire short loading section shall be the same as that of a pair of the standard cable in a loading section of normal length, and bridging across the said pairs of the said short loading section sufficient pairs of other conductors in the said building-out cable to make the capacitance of the pairs in the said short loading section equal to that of the pairs of standard cable in a loading section of normal length.

In testimony whereof, I have signed my name to this specification this 30th day of January, 1931.

RICHARD A. HAISLIP.